June 13, 1939. A. H. HABERSTUMP 2,162,347
CONVERTIBLE TOP FOR VEHICLE BODIES
Filed Aug. 30, 1935 3 Sheets-Sheet 1
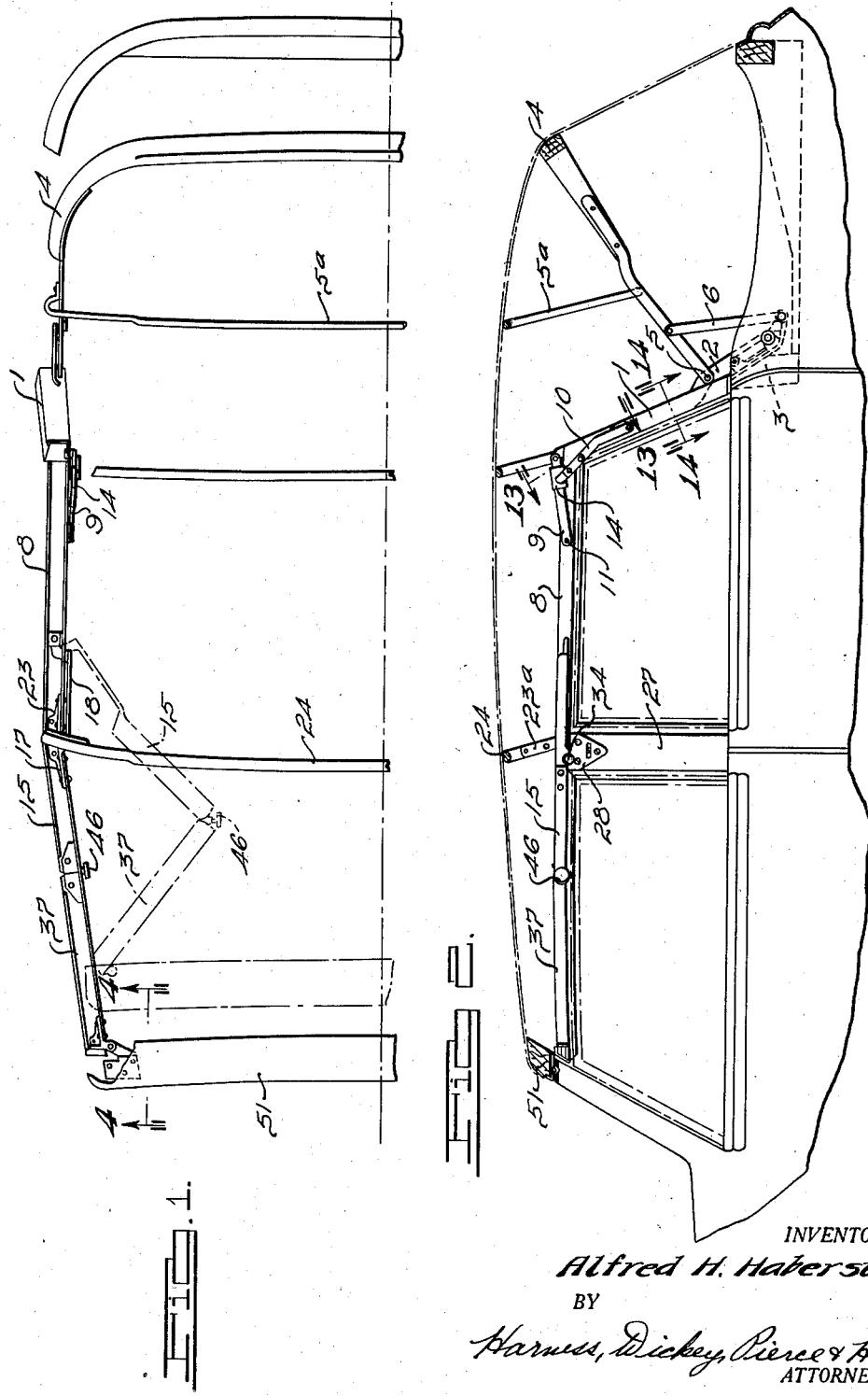
INVENTOR.
Alfred H. Haberstump.
BY
Harness, Dickey, Pierce & Hann
ATTORNEYS.

June 13, 1939. A. H. HABERSTUMP 2,162,347
CONVERTIBLE TOP FOR VEHICLE BODIES
Filed Aug. 30, 1935 3 Sheets-Sheet 2
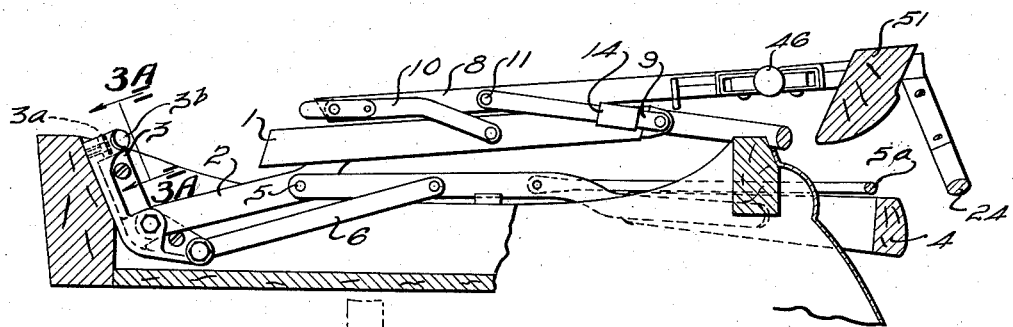
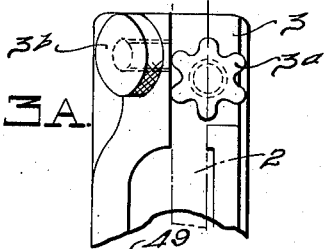
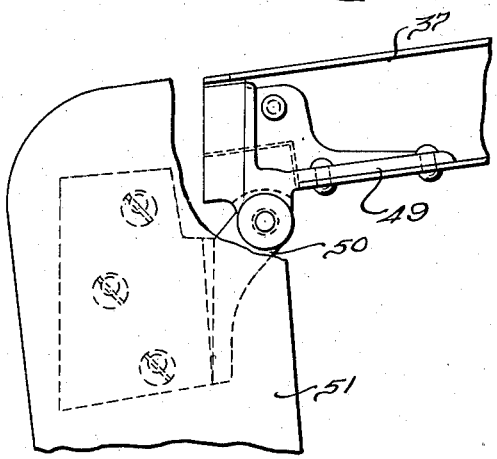
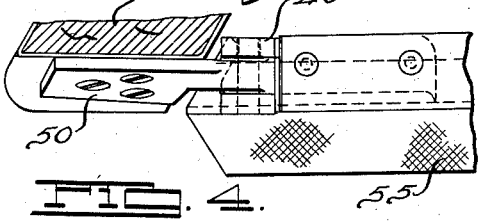
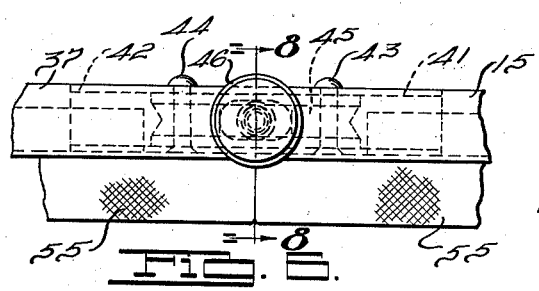
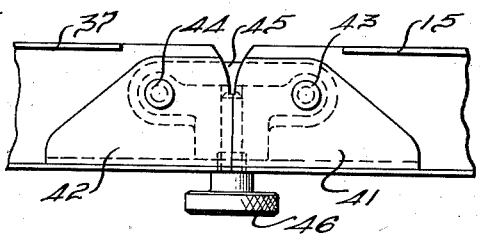
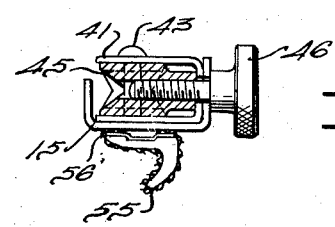
INVENTOR.
Alfred H. Haberstump.
BY
Harness, Dickey, Pierce & Hann
ATTORNEYS.

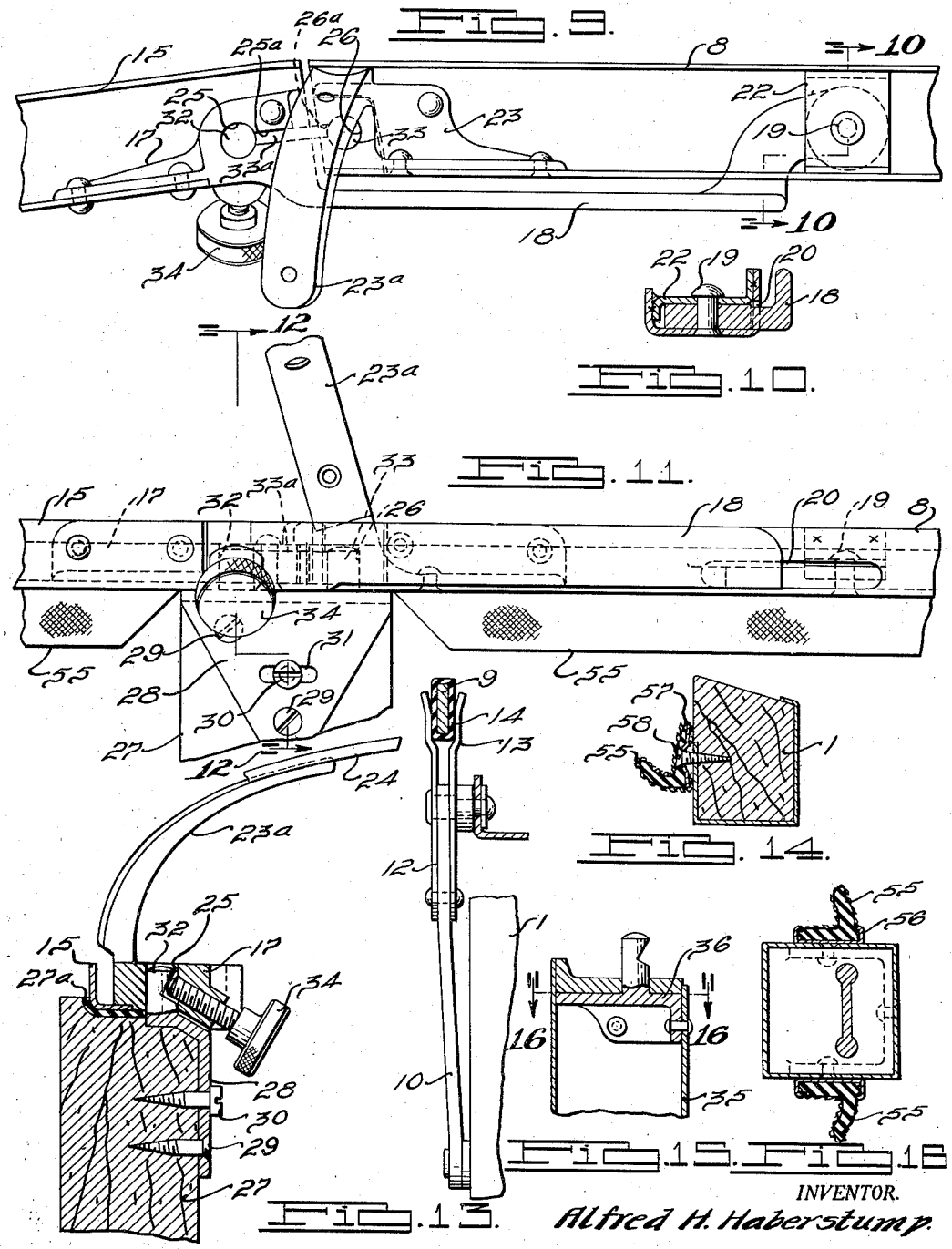

Patented June 13, 1939

2,162,347

UNITED STATES PATENT OFFICE 2,162,347

CONVERTIBLE TOP FOR VEHICLE BODIES

Alfred H. Haberstump, Detroit, Mich., assignor to The Murray Corporation of America, a corporation of Delaware Application August 30, 1935, Serial No. 38,591

2 Claims. (Cl. 296—121)

This invention relates generally to convertible tops for automobile bodies. More particularly it relates to that general class of automobile body tops which are designed for use with bodies having windows which may be elevated, and which will mate with the top to form an entirely closed superstructure.

In general, the embodiment of the invention shown herein is directed to that form of convertible top which is applied to automobile bodies having front and rear seats, and generally having four doors. However, it will be appreciated that a number of the features herein disclosed may advantageously be used in a top for two-seater automobiles.

In general, it is the object of the present invention to provide a collapsible top which will be relatively rugged in construction and simple to operate.

Another feature of the invention contemplates the provision of unusually tight joints between the pivoted and folding parts of the top in order that the likelihood of rattles may be materially decreased, and the top structure as a whole strengthened and made more rigid.

Another important feature of the present invention resides in the provision of novel means for locking pivoted side rail members together in order that there will be no rattling at the joints and the members will be retained in proper alignment in an end to end relation and in locked position.

Still another feature of the invention contemplates the provision of novel locking means for securing the side posts, which extend from the side of the automobile body to a point intermediate of the ends of the side rail members.

Yet another important feature of the invention resides in the interconnecting means between the rear brace members and side rail members. In the construction shown herein, it will be appreciated that each of the side rail members is connected to its side brace member by a pair of links pivotally connected to each of these members. It is inherent that one of these links, which is longitudinally disposed when the top is in the raised position, will necessarily have a certain amount of limited longitudinal movement. This is due to the fact that the top is not a rigid structure and that flexing thereof causes longitudinal movement of this link. The intermediate portion of this link is supported by means of a yoke member carried on the extreme end of the other link unit which interconnects the side rail and brace members. Resilient means are provided to pad the joints between the yoke members and the longitudinally disposed links in order to eliminate friction and squeaking when relative movement of these members takes place.

Still further, the invention contemplates provision of novel means for securing weather stripping members to the portions of the frame forming the marginal edges of the window openings. Novel means are provided herein for securing weather stripping members both to metallic surfaces and to wooden frame members.

Many other important details and features of the present invention will become apparent from the following specification when taken in connection with the accompanying drawings forming a part thereof.

In the drawings:

Fig. 1 is a plan view of a portion of a convertible top frame embodying the features of the present invention, the top covering being removed to facilitate the illustration.

Fig. 2 is a vertical sectional view of the top frame shown in Fig. 1.

Fig. 3 is a vertical sectional view of the top in folded or collapsed position.

Fig. 3a is a view taken on the line 3A—3A of Fig. 3 showing the means for adjusting the angular position of the side brace.

Fig. 4 is an enlarged sectional view taken on the line 4—4 of Fig. 1, showing the means by which the forward end of a side rail member is attached to the front bow of the top.

Fig. 5 is a plan view of the joint shown in Fig. 4, a portion of the front bow being broken away to facilitate the illustration.

Fig. 6 is an enlarged side elevation of the means provided for locking one of the forward and central side rail members together.

Fig. 7 is a plan view of the interlocking means shown in Fig. 6.

Fig. 8 is a transverse sectional view taken on the line 8—8 of Fig. 6 looking in the direction of the arrows.

Fig. 9 is a plan view showing the joint between one of the central and rear side rail members illustrating the pivotal connection therebetween and the means by which they are secured to one of the side posts.

Fig. 10 is a sectional view taken on the line 10—10 of Fig. 9 showing the detail of the pivotal connection between the side rail members shown in Fig. 9.

Fig. 11 is a side elevation of the portions of the central and side rail members shown in Fig. 9, showing those members mounted on and secured to one of the side posts.

Fig. 12 is a sectional view taken on the line 12—12 of Fig. 11 showing the side rail members secured to the side post.

Fig. 13 is a sectional view taken on the line 13—13 of Fig. 2 looking in the direction of the arrows.

Fig. 14 is a sectional view taken on the line 14—14 of Fig. 2 looking in the direction of the arrows showing the rear main brace members, with weather stripping secured thereto.

Fig. 15 is a vertical sectional view through a modified form of side post, and

Fig. 16 is a transverse sectional view through the modified form of side post shown in Fig. 15.

Inasmuch as the top structure is symmetrical in construction, both sides being alike, the following description is, in general, devoted to the structure of one side only, and it will be understood that such description might equally well be applied to the opposite side.

With more particular reference to the drawings, and particularly Figs. 1, 2 and 3, the improved top in general comprises a pair of main side brace members 1. These main side brace members are pivotally secured by means of an auxiliary arm 2 to a casting 3 secured to the body of the vehicle adjacent the rear portion thereof. A cap screw 3a having a toothed head to facilitate rotation is threadably mounted in the casting 3 and, as will hereinafter be seen, abuts against the auxiliary arm 2 to regulate the angular inclination of the side brace 1 when the top is raised. A thumb screw 3b is threaded laterally through the casting 3 and, when the top is in raised position, impinges against the side of the auxiliary arm 2 to lock it in position.

A main rear bow 4 is pivotally connected to the auxiliary arm 2 at the point 5 and is also connected to the casting 3 by means of a supporting link 6. This main rear bow 4 is offset in its side portions and has an auxiliary rear bow 5a pivotally connected thereto below the offsets in order that when the top is collapsed the main and auxiliary bows will occupy a minimum amount of space.

The side rail members of the top comprise three pivotally connected sections which will be described in detail hereinafter. The rearmost section 8 of these three sections is secured at its rear end to the main side brace 1 by means of two links 9 and 10. The link 9, it will be seen, has one end connected to the extreme upper end of the main side brace 1 and has its opposite end connected at a point 11 intermediate the ends of the rear side rail member 8. The link 10 is connected at one of its ends to a point about midway between the ends of the side brace member 1, and is pivotally connected at a point near its other end to the rear side rail member 8 at a point adjacent the end thereof.

An enlarged rear elevation of the link 10 is shown in Fig. 13. It will be seen that the link 10 has a pair of members 12 secured to either side thereof by means of suitable rivets and that these members extend beyond the end of the link 10, and form a yoke 13 adapted to receive the central portion of the link 9 when the top is in raised position. It will be apparent that a certain amount of distortion of the top normally encountered in its use will cause a limited amount of longitudinal movement of the link 9 with respect to the yoke 13 in which it seats. In order to prevent any undue friction between the yoke 13 and the member 9 which it serves to support, the member 9 is covered with a sleeve 14 clearly seen in Fig. 13, which serves to prevent squeaking when relative movement between the member 9 and yoke 13 takes place. This sleeve may be formed of rubber, fabric or other material designed to eliminate squeaks resulting from relative movement of these two links.

By reference to Figs. 1, 2 and 3, it may be seen that links 9 and 10 lie in substantially parallel relation when the top is folded and that when the top is in the raised position the yoke portion of the end of the link 10 serves to support the link intermediate the points at which it is pivoted to the brace member 1 and the side rail of the top 8.

The rear side rail element of the top is secured at its rear end to the side brace 1 in the manner just described and at its forward end is pivotally connected to an intermediate side rail member 15. It will be noted that all three of the side rail members in the embodiment of the invention herein shown, are formed of sheet metal of channel section in which the opening of the channel presents upwardly.

A casting 17 is secured by means of suitable rivets in the rear end of the intermediate side rail member 15. The casting 17 has a longitudinally projecting arm 18 which at its end is provided with an apertured bearing which fits over a pivot pin 19 secured in the rear side rail member 8. The extreme rear end of the arm 18, it will be noted, projects through a suitable aperture 20 in the side wall of the channel member 8 and thence to the pivot 19. One end of the pivot 19 is supported by the base of the channel 8, and the opposite end is supported by means of an auxiliary wall 22, having flanges welded to the walls of the channel 8.

Mounted in the forward end of the rear side rail member 8 is the casting 23. This casting 23 has a projecting arm 23a which extends arcuately upwardly and inwardly and provides means for anchoring one end of an intermediate top bow 24. Both the castings 17 and 23 have apertures 25 and 26 therein formed near the ends of the respective rail members to which they are secured. These apertures 25 and 26 register with apertures in the base of the channel members to which they are secured. Slots 25a and 26a are cut through the castings 17 and 23 and the channels 15 and such that when these members are arranged in end-to-end relation a continuous slot will be formed therebetween, the function of which will hereinafter be clearly seen.

A side post 27 serves to support the side rail members of the top at this point. Details of the construction of this side post are shown in the sectional view Fig. 12. As will be seen in this figure, the side post is formed of wood and has at its upper end a casting 28 secured thereto by means of a plurality of screws. Permanent securement of the casting 28 to the upper end of the post 27 is accomplished by means of three screws 29. However, tentative adjustment of this member relative to the post 27 may be accomplished by means of the screw 30 which passes through a longitudinal slot 31 in the front plate of the casting 28. This construction is particularly advantageous because in specific instances it is often desirable to adjust the longitudinal position of the casting 28 upon the post 27 in order to obtain an accurate fit of the top, with respect to this post.

The upper side of the casting 28 has formed thereon a pair of spaced, upwardly projecting studs 32 and 33 having an integrally formed interconnecting web 33a therebetween. These studs are adapted to fit into the apertures 25 and 26 respectively and the web 33a is received by the communicating slots 25a and 26a.

The stud 32 is notched to receive a set screw 34 threadably mounted in the casting 17 in order to secure the side rail members to the post. It will be seen that the studs 32 and 33 together with the web 33a therebetween serve to cooperate with the apertures 25 and 26 and the slots 25a and 26a to maintain the side rail members in proper alignment on top of the side post. A resilient pad 27a of rubber or other suitable material is set into the top of the post 27 in order to provide a resilient seat for the channel members 8 and 15.

In the modified form of the side post members shown in Figs. 15 and 16, the side post is composed of a sheet metal member of hollow section 35 having a casting 36 secured by means of rivets into the upper end thereof and having formed on said casting the studs with a web therebetween similar to those shown on the casting 28 just described.

The joint between the forward end of the intermediate side rail member 15 and the rear end of a forward side rail member 37 is shown in detailed views in Figs. 6 and 7. A pair of channel elements 41 and 42 are secured by any suitable means, such as welding, within the adjacent ends of the forward and intermediate side rail channels. These channels have their bases secured to the inner side wall of the side rail members and serve to provide mounting means for pivots 43 and 44 which pivotally mount a casting 45 which connects the forward and intermediate side rail members.

The abutting ends of these two channel members are cut away at their outboard side to provide arcuate surfaces, thus permitting the two members to swing about their respective pivots 43 and 44. Threadably mounted in the casting 45 intermediate the pivot points thereof is a set screw 46, which, when the two members have their ends in abutting relation, serves to engage the outside surfaces thereof and lock the two members in end to end abutting relationship.

The forward end of the forward side rail member has mounted therein a casting 48 which serves to provide a pivot point for mounting this member in pivoted relation to a front bow 49. This casting 48 serves to cooperate with a casting 50 secured to the front bow 51 to provide a pivotal support for the forward rail member with respect to the front bow.

All of the rail members and side brace members including the post 28, which surround window openings in the top, are provided with weather stripping generally designated by the character 55. Throughout the points where this weather stripping is secured to metallic elements of the top, the weather stripping is mounted in a metallic member 56 of channel cross section, which has its base welded to the particular member to which the weather stripping is to be attached, the edges of the channel gripping the base of the weather stripping. Where this weather stripping is adapted to be secured to wooden members such as along the vertical sides of the post 27, the weather stripping is provided with a metallic backing 57 which is provided with suitable holes at intervals in order that it may be mounted upon the wood surface by means of screws 58. Detailed view of such a mounting is shown in the sectional view Fig. 14.

When it is desired to lower the top, the set screws 34 on each side of the top are loosened sufficiently to allow the forward and intermediate side rail members to swing about their respective pivots. The set screws securing the side rail members to the side posts are loosened sufficiently to permit the side rail members to be raised off the studs 32 and 33 on which they were seated. The rear ends of the front and side rail members are pulled inwardly, as shown by the dotted line position in Fig. 1, and the front bow is then pushed rearwardly to a position adjacent the intermediate bow 24. The whole top is then pushed rearwardly until it assumes the position shown in Fig. 3. Raising of the top, of course, may be accomplished by a reversal of the above outlined steps.

It will be apparent to those skilled in the art that while the embodiment of the invention herein defined has been very specifically described, that this specific embodiment is merely illustrative of one of numerous modifications falling within the scope of the following claims.

What is claimed is:

1. In a convertible top structure, a pair of channel section side rail members, a link interconnecting said members, said link being pivotally connected to the base of each of said channel members and a lock screw threaded into said connecting link and having a shoulder adapted to engage the side walls of the adjacent ends of said rail members to secure them in locked end to end relation.

2. In a convertible top structure, a pair of side rail members, a link interconnecting said side rail members, said link being pivotally connected to one end of each of said members, and a lock screw threaded into said link member, said lock screw having a shoulder adapted to engage portions of the adjacent ends of each of said members to secure them in locked end to end relation.

ALFRED H. HABERSTUMP.